F. BEERS AND H. L. POWELL.
TRAY FOR CARRYING CAKES, &c.
APPLICATION FILED AUG. 27, 1920.
1,390,665.  Patented Sept. 13, 1921.
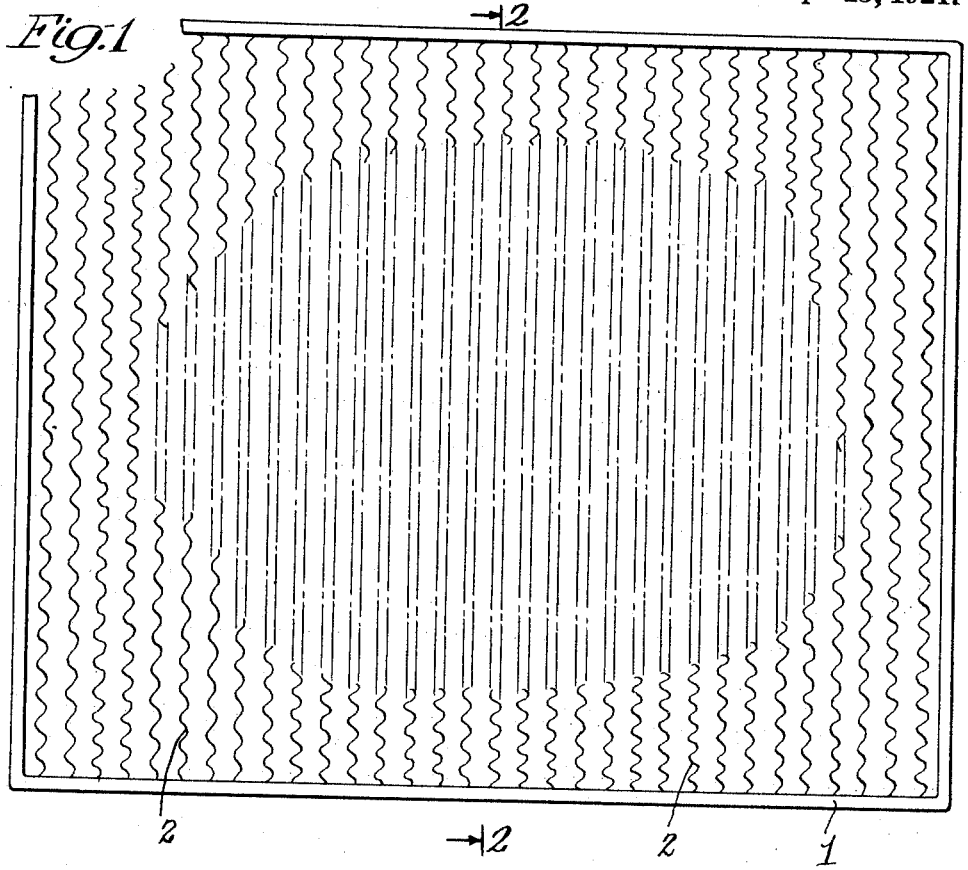
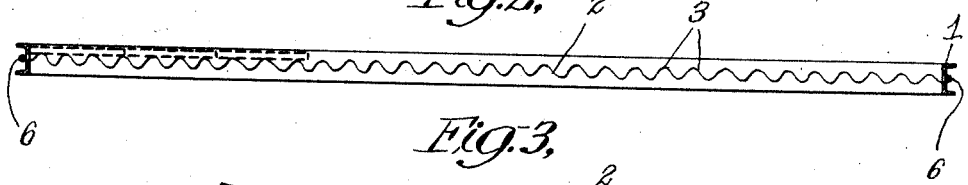
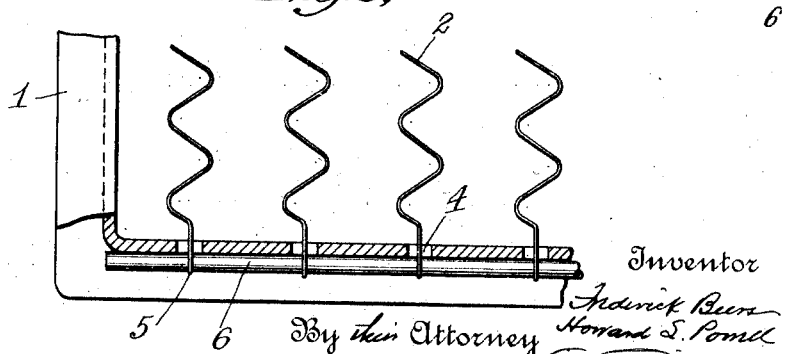

UNITED STATES PATENT OFFICE.

FREDERICK BEERS, OF NEW ROCHELLE, AND HOWARD L. POWELL, OF NEW YORK, N. Y., ASSIGNORS TO NATIONAL BISCUIT COMPANY, OF NEW YORK, N. Y., A CORPORATION OF NEW JERSEY.

TRAY FOR CARRYING CAKES, &c.

1,390,665.      Specification of Letters Patent.      Patented Sept. 13, 1921.

Application filed August 27, 1920. Serial No. 406,447.

*To all whom it may concern:*

Be it known that we, FREDERICK BEERS, a resident of New Rochelle, in the county of Westchester and State of New York, and HOWARD L. POWELL, a resident of the borough of Manhattan, in the city, county, and State of New York, both citizens of the United States, have invented certain new and useful Improvements in Trays for Carrying Cakes, &c., of which the following is a specification.

Our invention relates to trays or pans on which small cakes, crackers and the like may be carried during the manufacturing processes. The trays may be used for supporting small cakes, after icing or the like has been applied to the cakes, the trays carrying the cakes being moved from the icing machine to and through the driers, or the trays may, of course, be used during other operations or for other purposes.

The object of our invention is to provide a tray which shall be simple in construction and have other desirable properties. Our improved construction provides an open tray in which the bottom surfaces of the articles carried thereby are acted upon freely by the air, or by the heat of a drier or baking apparatus or the like. The supporting surface of the tray is so formed as to provide substantially point support for the articles carried. That is to say, each small article will be supported at a number of points, in contradistinction to a support for the articles which engages the same over a considerable surface or along lines. In the case of a cake which has been coated on both sides with icing or the like, a support for the same at several small points only will not mar the appearance of the icing surface which rests upon the support, to the same extent as would be the case if the cake were supported upon a flat surface or upon parallel or other lines.

We accomplish the desired results referred to above, in our preferred construction, by forming the supporting surface of an open tray by the provision of parallel wires extending across the marginal frame of the tray which wires are so curved or bent, preferably in spiral form, as to provide in each wire a plurality of adjacent supporting points, the wires being sufficiently close together for the desired purpose.

In order that a clearer understanding of our invention may be had attention is hereby directed to the accompanying drawings forming part of this application and illustrating one embodiment of our invention. In the drawings Figure 1 represents a top plan view of a tray embodying our invention, Fig. 2 represents a vertical section taken on line 2—2 of Fig. 1, and Fig. 3 represents a top plan view, on an enlarged scale, of one corner portion of the tray, the marginal frame being shown partly in section so as to show a rod to which the ends of the supporting wires are secured.

Referring to the drawings the tray is provided with a marginal frame 1 which is preferably formed of metal. The frame 1 is also preferably of a channel section with the flanges thereof directed outwardly.

The supporting surface of the tray is formed by a plurality of wires 2 which preferably extend in parallel relation across the marginal frame, from one side thereof to the opposite side. Each of the wires 2 is so curved or bent as to provide a plurality of comparatively small rounded points 3 which are at a higher level than the other portions of the wires. These points 3 on the various wires are all in substantially the same horizontal plane and therefore form the supporting surfaces for the articles which are positioned on the tray.

The separated supporting points 3 are preferably provided by curving the wires 3 in spiral form, as shown.

The ends of the wires may be secured to the marginal frame in various ways. In the construction which we prefer to use the web portions of the channel frame 1 are provided, on opposite sides, with small openings 4, equal in number to the wires 2 which are to be used. The wires are provided with straight end portions which are extended through openings 4, these end portions 5 of the wires being provided with loops through which rods 6 extend. These rods rest against the outer surfaces of the web portions of opposite members of the channeled frame and are held in position by the tension of the wires.

The wires should be mounted closely enough together to enable a small cake or the like to bridge across at least two of the same, and the supporting points 3 in each wire should be close enough together to enable at least two of the same in each wire to act as supporting points for each article.

It should be understood that our invention is not limited to the exact details of construction described but is as broad as is indicated by the accompanying claims.

What we claim is:

1. A tray for small food products, comprising a marginal frame and a plurality of parallel spirally curved wires extending across said frame.

2. A tray for small food products comprising a marginal frame, opposite members of which have a plurality of horizontal openings therethrough, curved wires extending across said frame, with their ends extending through said openings, and rods mounted on the outer sides of said members, to which the ends of said wires are secured.

This specification signed and witnessed this 20th day of August, 1920.

FREDERICK BEERS.
HOWARD L. POWELL.

Witnesses:
G. M. SUNDHEIM,
L. D. KIDD.